US 8,808,016 B2

(12) United States Patent
Adachi et al.

(10) Patent No.: US 8,808,016 B2
(45) Date of Patent: Aug. 19, 2014

(54) ROTATABLE CONNECTOR DEVICE

(71) Applicants: Ryoichi Adachi, Shiga (JP); Kazutaka Kamiya, Shiga (JP)

(72) Inventors: Ryoichi Adachi, Shiga (JP); Kazutaka Kamiya, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/674,595

(22) Filed: Nov. 12, 2012

(65) Prior Publication Data
US 2013/0065413 A1    Mar. 14, 2013

Related U.S. Application Data

(63) Continuation of application No. PCT/JP2011/060727, filed on May 10, 2011.

(30) Foreign Application Priority Data

May 10, 2010   (JP) ................................. 2010-108513

(51) Int. Cl.
*H01R 3/00* (2006.01)
(52) U.S. Cl.
USPC ...................................................... 439/164
(58) Field of Classification Search
CPC ... H01R 35/025; H01R 2201/26; H01R 35/02
USPC ........................ 439/164, 10–15, 162, 534, 475
See application file for complete search history.

(56) References Cited

U.S. PATENT DOCUMENTS

| 7,452,224 B1 * | 11/2008 | McDonald et al. ........... 439/164 |
| 8,083,525 B2 * | 12/2011 | Fiala et al. ........................ 439/15 |
| 2005/0180727 A1 * | 8/2005 | Yajima et al. .................. 385/147 |

FOREIGN PATENT DOCUMENTS

| JP | 2006-014510 A | 1/2006 |
| JP | 2009-217974 A | 9/2009 |

OTHER PUBLICATIONS

International Search Report issued in PCT/JP2011/060727, mailed on Jul. 19, 2011 and translation thereof (2 pages).

* cited by examiner

*Primary Examiner* — Edwin A. Leon
(74) *Attorney, Agent, or Firm* — Osha Liang LLP

(57) ABSTRACT

A rotatable connector device includes a steering roll connector that accommodates a flat cable in an accommodation space in the state where the flat cable can be wound and unwound. Also, a plurality of rotatable rollers are located on a top surface of a retainer concentrically with the retainer at an equal interval in a circumferential direction of the retainer. A regulation section on which a reversed part is allowed to be pressed is provided on the top surface of the retainer at a position away from one of the plurality of rotatable rollers, namely, a rotatable roller, on the side of a part of the rotatable roller along which the reversed part can be wound. The regulation section is away from the part of the rotatable roller by a gap which allows the reversed part to contact or detached from the rotatable roller.

4 Claims, 8 Drawing Sheets

US 8,808,016 B2

ROTATABLE CONNECTOR DEVICE

TECHNICAL FIELD

The present invention relates to a rotatable connector device mountable on a vehicle such as an automobile or the like, and specifically to a rotatable connector device usable for electrically connecting elements on the side of a steering wheel and the vehicle body side to each other via flat cables.

BACKGROUND ART

As a conventional rotatable connector using flat cables as mentioned above, an already proposed rotatable connector (see Patent Document 1), for example, has a structure in which a reversed part of flat cables accommodated in a ring-shaped space is guided by a rotatable roller axially supported by a holder (retainer) and a guide wall projecting in the vicinity of the rotatable roller.

In more detail, as shown in FIG. 8, an outside wound part Co of the above-mentioned flat cables C is accommodated in the ring-shaped space in the state of being wound along an inner circumferential surface of an outer cylindrical body 61 of a stator member. An inside wound part Ci of the flat cables C is accommodated in the ring-shaped space in the state of being wound along an outer circumferential surface of an inner cylindrical body 62 of a rotor member. A reversed part Cr of the flat cables C is wound along one rotatable roller 63 axially supported by a holder. The rotatable holder 63 along which the reversed part Cr is wound is located on a reference line D passing axial centers P of a plurality of other rotatable rollers 63 located concentrically with the holder in a circumferential direction of the holder.

When the rotor member of the rotatable connector having the above-described structure is rotated in a clockwise direction, the reversed part Cr of the flat cables C is pressed on a guide wall 64, and the pressing force causes the holder to rotate in the clockwise direction. When the rotor member is rotated in a counterclockwise direction, the reversed part Cr of the flat cables C pulls the rotatable roller 63, along which the reversed part Cr is wound, in the counterclockwise direction, and the holder is rotated in the counterclockwise direction.

With the above-described structure, the outside wound part Co of the flat cables C wound along the inner circumferential surface of the outer cylindrical body 61 does not have any inflection point, but the inside wound part Ci of the flat cables C wound along the outer circumferential surface of the inner cylindrical body 62 has an inflection point. Therefore, the curvature deformation ratio across the inflection point of the inside wound part Ci is gradually increased in a downstream direction and an upstream direction with respect to the inflection point.

Accordingly, when the rotor member is rotated in the clockwise direction, the reversed part Cr, having a large curvature deformation ratio, of the flat cables C is regulated in the state of being pressed to an outer corner of the guide wall 64 or the vicinity thereof, and the flat cables C is fed while the reversed part Cr thereof is slid on the outer corner of the guide wall 64 or the vicinity thereof.

Namely, the reversed part Cr of the flat cables C and the guide wall 64 are in point contact or in line contact with each other. Therefore, the contact area between the reversed part Cr and the guide wall 64 is small, and thus the reversed part Cr of the flat cables C is slid in the state where a part of the reversed part Cr receives a load (reaction force) from the retainer in a concentrated manner. For this reason, when the connector is operated to rotate repeatedly, lamination covers of the flat cables C are likely to be worn. Thus, there are problems that, for example, conductors exposed by the wearing may be shortcircuited or broken.

CITATION LIST

Patent Literature

Patent Document 1: Japanese Laid-Open Patent Publication No. 2009-217974

SUMMARY OF INVENTION

Technical Problem

The present invention has an object of providing a rotatable connector device capable of significantly decreasing the number of times that a flat cable is fed while a reversed part thereof is slid.

Solution to Problem

The present invention is directed to a rotatable connector device, comprising a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the ring-shaped fixed-side ring plate, the rotator and the stator being engaged with each other so as to be rotatable with respect to each other in a clockwise direction and a counterclockwise direction. In an accommodation space defined by the rotatable-side ring plate and the inner cylindrical section of the rotator and the fixed-side ring plate and the outer cylindrical section of the stator, a ring-shaped retainer for axially supporting a plurality of rotatable rollers is accommodated, and also a flat cable for electrically connecting the rotator and the stator to each other, the flat cable having a reversed part which is turned around in the middle of the flat cable in a length direction thereof, is accommodated such that the flat cable can be wound and unwound. The plurality of rotatable rollers are located on a top surface of the retainer, concentrically with the retainer at an equal interval in a circumferential direction of the retainer, and a regulation section on which the reversed part is allowed to be pressed is provided on the top surface of the retainer at a position away from one of the plurality of rotatable rollers, on the side of apart of the one rotatable roller along which the reversed part can be wound, the regulation section being away from the part of the one rotatable roller by a gap which allows the reversed part to contact or detached from the one rotatable roller. The one rotatable roller along which the reversed part can be wound is located outer to a reference line connecting axial centers of the other rotatable rollers which are located concentrically with the retainer in the circumferential direction of the retainer.

Owing to the above-described structure, the number of times that the flat cable is fed while a reversed part thereof is slid can be significantly decreased.

In more detail, the rotatable roller along which the reversed part of the flat cable can be wound is located outer to a reference line connecting axial centers of the other rotatable rollers which are located concentrically with the retainer in the circumferential direction of the retainer. Therefore, a gap, made between the rotatable roller and the regulation section, through which the reversed part passes can be formed to have a shape in accordance with the curvature of the reversed part. In addition, when the rotation direction of the rotatable connector device is switched from a counterclockwise direction to a clockwise direction, the distance by which the reversed part moves in no contact with the rotatable roller or the regulation section after being released from the contact with the rotatable roller until contacting the regulation section can be increased.

As a result, when the rotatable connector device mounted on a vehicle receives small swings from a vehicle handle while the vehicle is running, namely, when a motion of switching the rotation direction of the vehicle handle from the counterclockwise direction to the clockwise direction by a small angle is repeated, the state where the flat cable and the regulation section are out of contact with each other can be increased.

Owing to this, the number of times that the reversed part of the flat cable and the regulation section contact, and thus are slid on, each other is significantly decreased. Thus, the lamination cover of the flat cable is less likely to be worn. Accordingly, shortcircuiting or breakage of conductors can be prevented.

In an embodiment of the present invention, the one rotatable roller may be formed to have a diameter which is shorter than a distance between a circumferential surface of the inner cylindrical section and a circumferential surface of the outer cylindrical section, the circumferential surfaces facing each other.

Owing to the above-described structure, when the rotation direction of the rotatable connector device is switched from the counterclockwise direction to the clockwise direction, the distance by which the reversed part moves in no contact with the rotatable roller or the regulation section after being released from the contact with the rotatable roller until contacting the regulation section can be increased.

Owing to this, the number of times that the reversed part of the flat cable and the regulation section contact, and thus are slid on, each other is further decreased. Thus, the lamination cover of the flat cable is less likely to be worn. Accordingly, shortcircuiting or breakage of the conductors can be further prevented.

In an embodiment of the present invention, the rotatable connector device may further comprise friction resistance reduction means for reducing a friction resistance provided to the reversed part, the friction resistance reduction means being provided on a part of a surface of the regulation section on which the reversed part is pressed.

Owing to the above-described structure, the friction resistance provided to the reversed part pressed to the regulation section can be reduced by the friction resistance reduction means.

Therefore, the friction of the reversed part caused when the reversed part is slid can be reduced.

The flat cable is a band-like flexible transmission line, which includes a plurality of flat straight-angle conductors aligned parallel to each other at a prescribed pitch and is covered with an electrically insulating body. One flat cable or a plurality of flat cables are wound around.

The friction resistance reduction means may be formed of a coating agent having a small coefficient of friction such as, for example, a fluorine resin or the like.

Advantageous Effects of Invention

According to the present invention, a rotatable connector device capable of significantly decreasing the number of times that a flat cable is fed while a reversed part thereof is slid can be provided.

DESCRIPTION OF EMBODIMENTS

Hereinafter, an embodiment of the present invention will be described with reference to the drawings.

As shown in FIG. 1 through FIG. 5, a steering roll connector 10 (SRC 10) in this embodiment includes a cable housing 11, a retainer 41, and a rotation lock unit 51.

Figure 1:
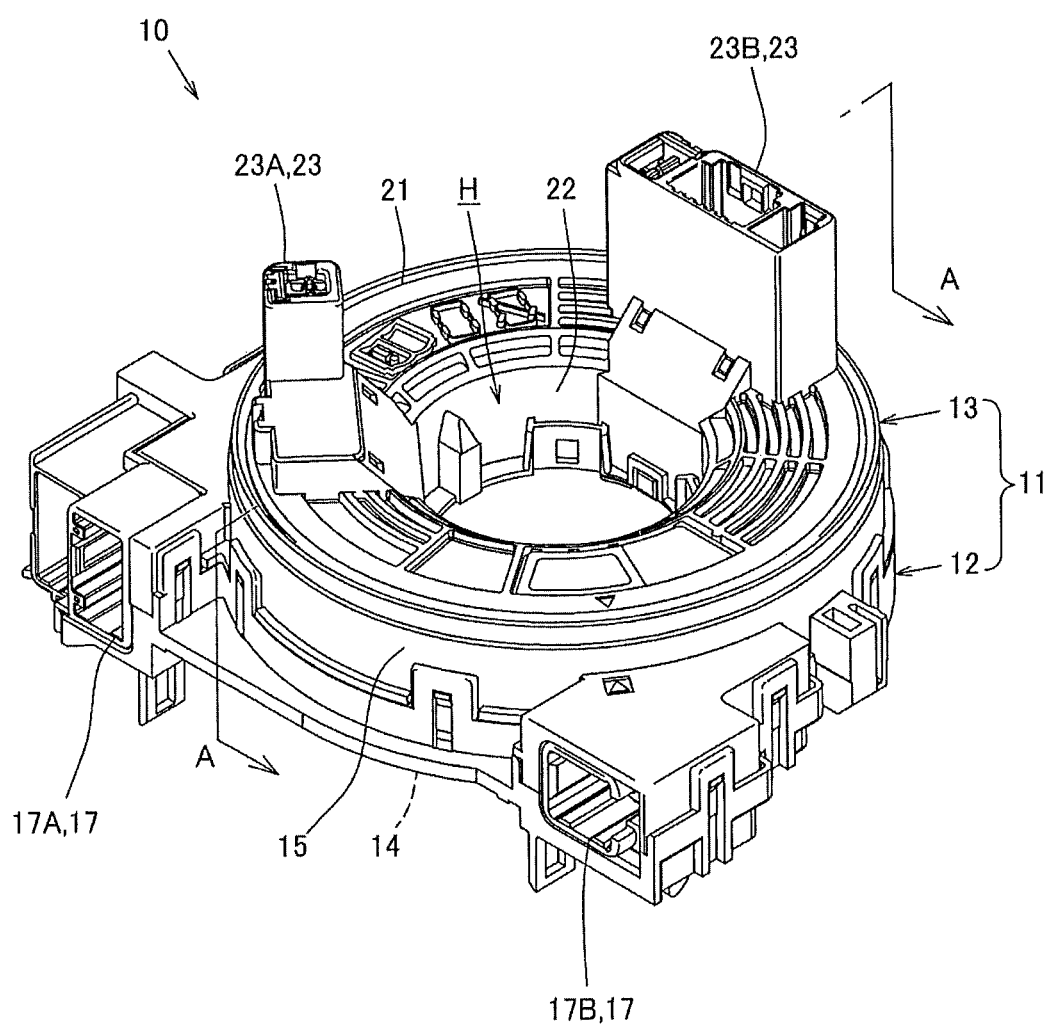
FIG. 1 is an external isometric view of a steering roll connector in an embodiment.
Figure 2:
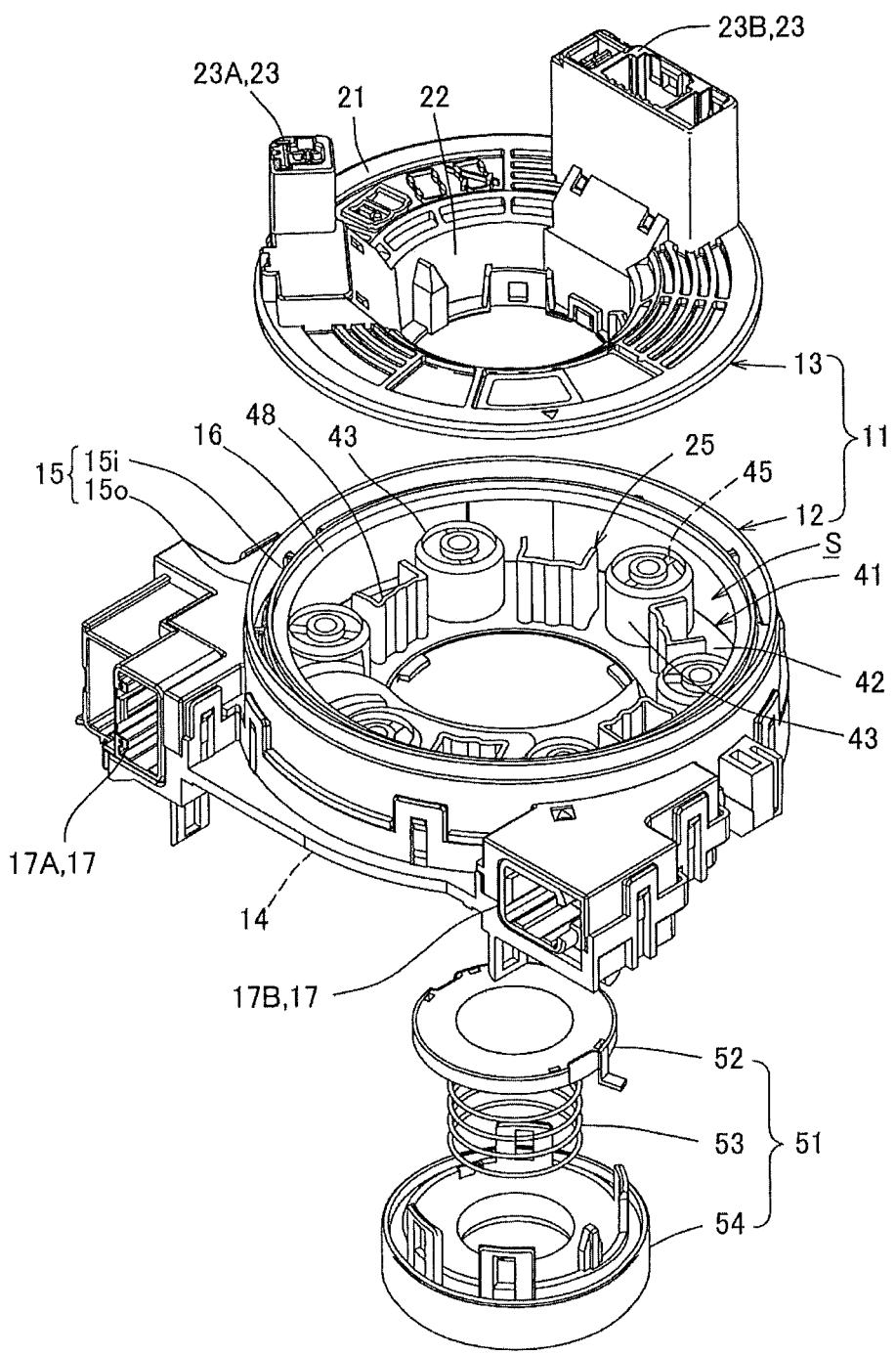
FIG. 2 is an exploded isometric view of the steering roll connector in the embodiment.
Figure 3:
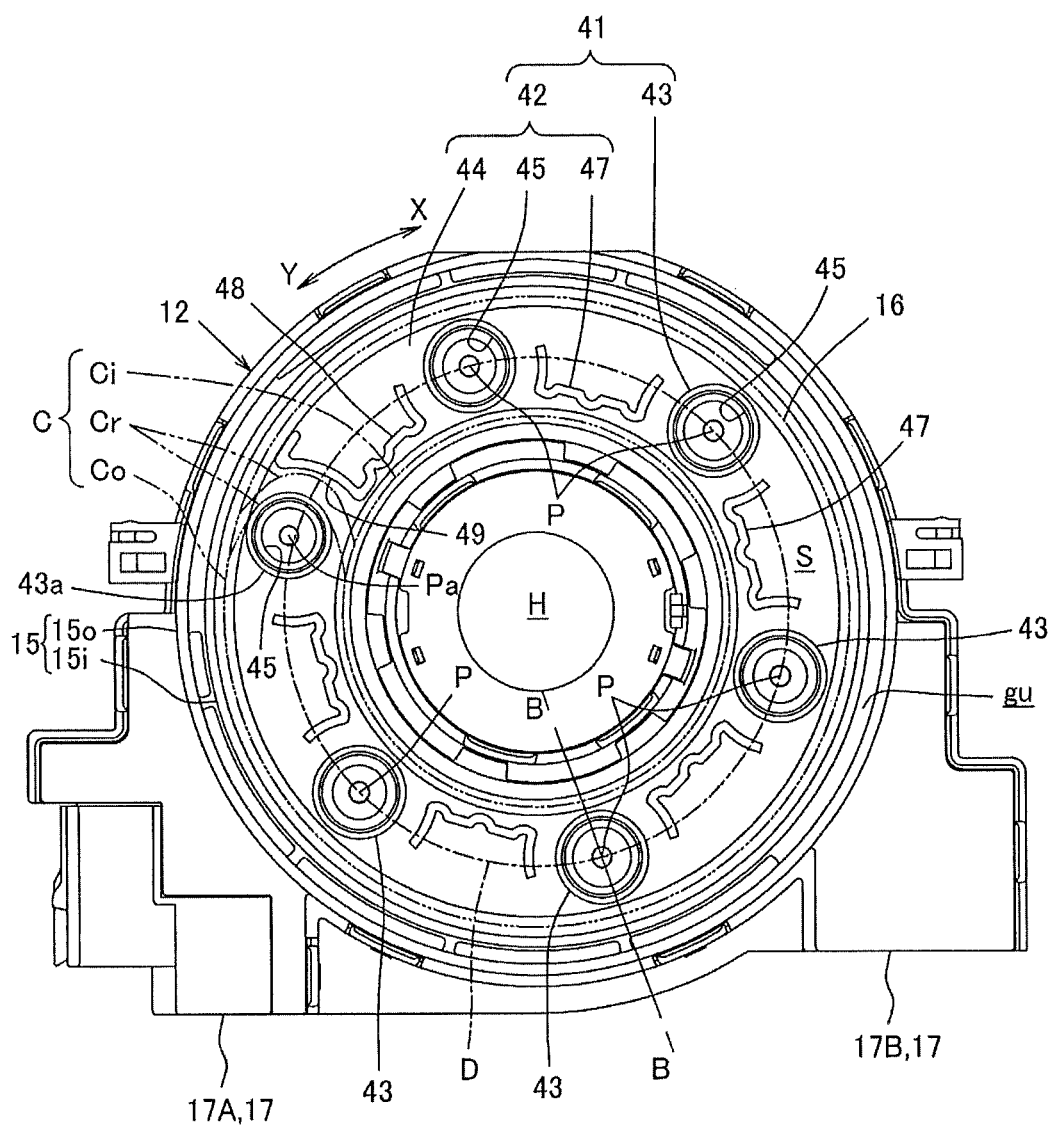
FIG. 3 is a plan view of the steering roll connector in the state where a rotator has been detached.
Figure 4:
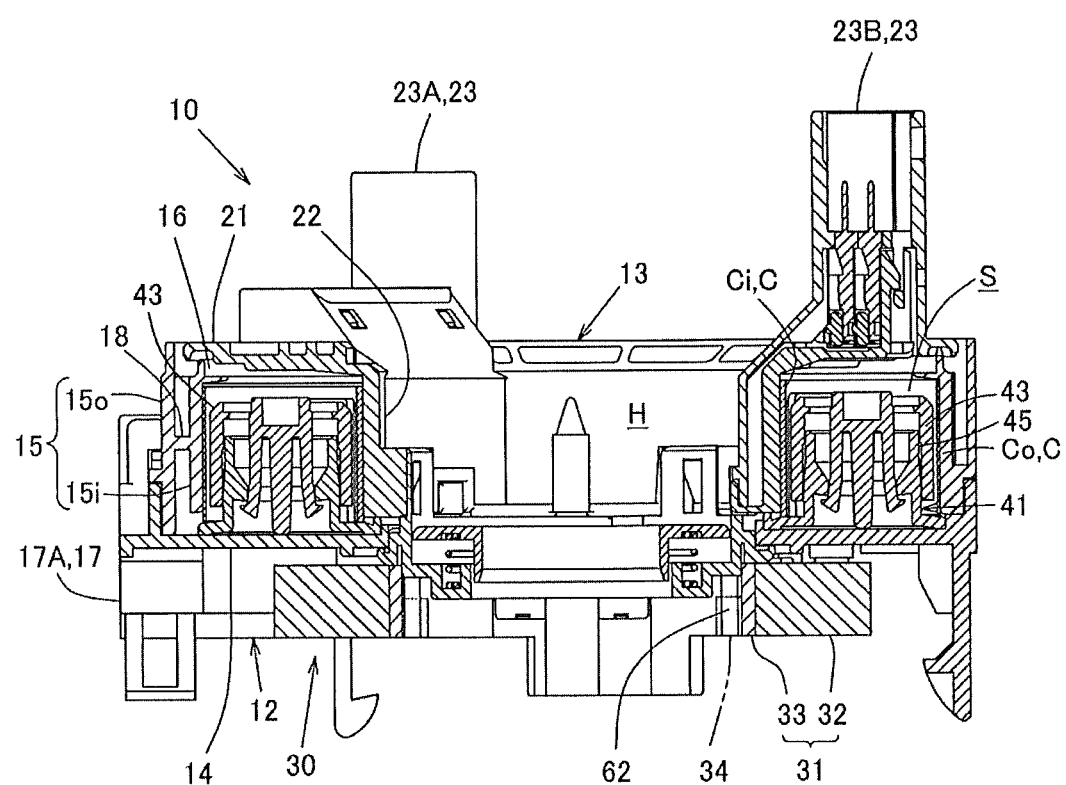
FIG. 4 is a cross-sectional view of FIG. 1 taken along line A-A in FIG. 1.
Figure 5:
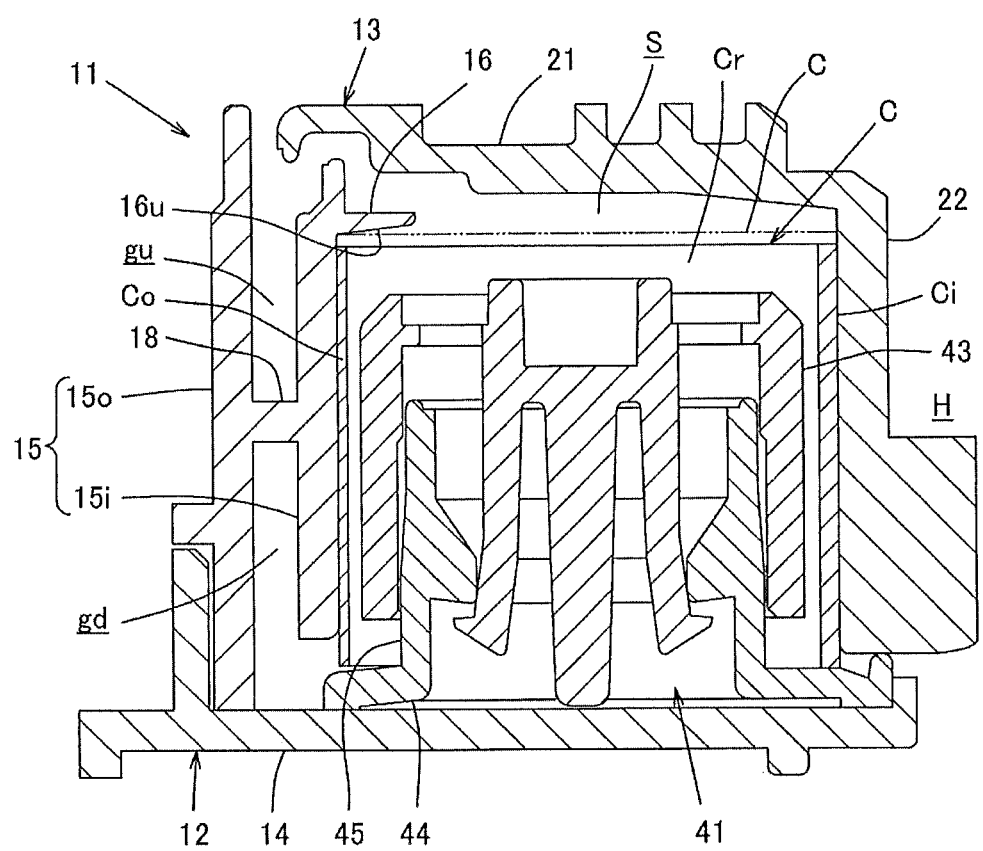
FIG. 5 is an enlarged end view showing apart of FIG. 4.
Figure 6:
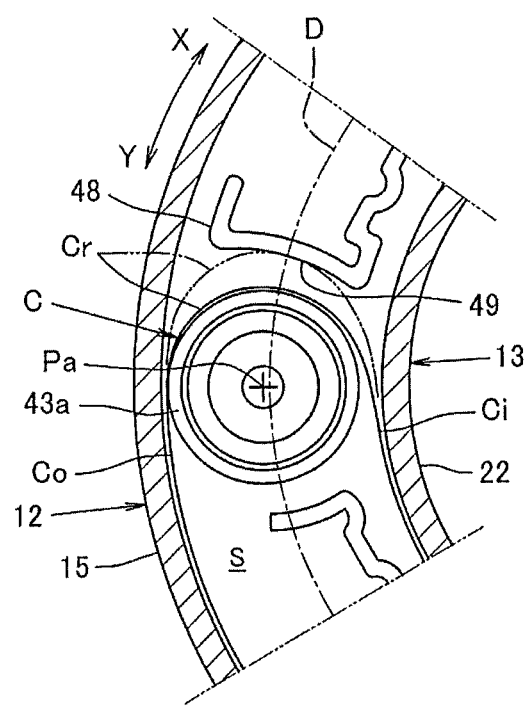
FIG. 6 is a view illustrating an operation when flat cables are wound along a small diameter rotatable roller.

FIG. 1 and FIG. 2 are respectively an external isometric view and an exploded isometric view of the steering roll connector 10. FIG. 3 is a plan view of the steering roll connector 10 in the state where a rotator 13 described later has been detached. FIG. 4 is a cross-sectional view of FIG. 1 taken along line A-A in FIG. 1. FIG. 5 is an enlarged end view showing a part of FIG. 4. FIG. 6 is an operational view illustrating an operation when flat cables C are wound along a small diameter rotatable roller.

The cable housing 11 is formed to have a generally cylindrical shape having an insertion hole H at a center thereof when seen in a plan view. The insertion hole H runs through the cable housing 11 in an axial direction. The insertion hole H is formed to have a diameter which allows a steering shaft supported by a steering column (not shown) to be inserted therethrough.

At a top end of the steering shaft, a steering wheel to be rotated is fixed.

The cable housing 11 includes a stator 12 and a rotator 13 engaged with each other so as to be rotatable with respect to each other. As shown in FIG. 2 through FIG. 5, in the cable housing 11, an accommodation space S is formed in which flexible flat cables C (hereinafter, referred to as the "flat cables C") are accommodated in the state of being wound around appropriately.

The accommodation space S is defined by a fixed-side ring plate 14 and an outer cylindrical section 15 of the stator 12 and a rotatable-side ring plate 21 and an inner cylindrical section 22 of the rotator 13, the stator 12 and the rotator 13 being rotatable with respect to each other.

The stator 12 is fixed to an appropriate member on the side of a vehicle body, for example, a combination bracket switch (not shown) of the steering column.

The stator 12 includes the fixed-side ring plate 14 formed to be ring-shaped as a bottom plate and the outer cylindrical section 15 having a cylindrical shape and extending vertically from an outer circumferential edge of the fixed-side ring plate 14. The outer circumferential edge of the fixed-side ring plate 14 and a bottom end of the cylindrical section 15 are engaged with each other to be integral.

As shown in FIG. 4 and FIG. 5, the outer cylindrical section 15 has a two-layer structure including an outside outer cylindrical section 15o having a cylindrical shape and an inside outer cylindrical section 15i having a cylindrical shape. The inside outer cylindrical section 15i has a slightly shorter diameter than a diameter of the outside outer cylindrical section 15o and is formed inner to the outside outer cylindrical section 15o. The outside outer cylindrical section 15o and the inside outer cylindrical section 15i are located concentrically and face each other in a radial direction closely to each other.

The outside outer cylindrical section 15o and the inside outer cylindrical section 15i are coupled to each other to be integral via a coupling section 18 at an intermediate position in an axial direction of the steering wheel (up-down direction in FIG. 4 and FIG. 5). A gap made between the outside outer cylindrical section 15o and the inside outer cylindrical section 15i in the radial direction is divided into two in the up-down direction by the coupling section 18. As a result, as shown in FIG. 5, two grooves gu and gd opened upward and downward respectively are formed.

The groove gu opened upward is formed continuously in a circumferential direction along the outside outer cylindrical section 15o or the inside outer cylindrical section 15i around the axis of the stator 12 as the center.

As shown in FIG. 5, the inside outer cylindrical section 15i has a brim-like guide projection piece 16 in a top portion thereof, at a position above the flat cables C wound around in the accommodation space S. The guide projection piece 16 projects inward in the radial direction (diametrically inner direction) toward the accommodation space S, and guides the flat cables C from above.

The guide projection piece 16 is ring-shaped when seen in a plan view and projects straight into the accommodation space S along an inner circumferential edge of the top portion of the inside outer cylindrical section 15i. A bottom surface 16u of the guide projection piece 16 is formed to be tapered, specifically, to be inclined upward and also inward in the radially inner direction.

To the stator 12, stator-side connectors 17 are attached (see FIG. 2).

The stator-side connectors 17 include a first stator-side connector 17A and a second stator-side connector 17B. The first stator-side connector 17A and the second stator-side connector 17B are located outer to the outer cylindrical section 15 with a prescribed distance held therebetween such that respective connector connection openings are directed in the same direction.

The rotator 13 includes the rotatable-side ring plate (top board) 21 formed to be ring-shaped and the inner cylindrical section 22 having a cylindrical shape and extending vertically from an outer circumferential edge of the rotatable-side ring plate 21.

The rotator 13 is structured to be fixed to the steering wheel not shown and rotatable integrally with the steering wheel. Therefore, the rotator 13 is rotatable with respect to the stator 12 coaxially with the steering wheel.

The rotatable-side ring plate 21 is located to face the fixed-side ring plate 14 in a direction of a rotation axis of the rotator 13.

The inner cylindrical section 22 is located to face the outer cylindrical section 15 in the radial direction.

To the rotator 13, rotator-side connectors 23 are attached, which are rotatable integrally with the rotator 13 in accompaniment with the rotation of the rotator 13.

The rotator-side connectors 23 include a first rotator-side connector 23A and a second rotator-side connector 23B.

The first rotator-side connector 23A and the first stator-side connector 17A are electrically connected to each other via the flat cable C located in the accommodation space S. The second rotator-side connector 23B and the second stator-side connector 17B are electrically connected to each other via the flat cable C located in the accommodation space S.

The stator-side connectors 17 are each connected to a cable (not shown) drawn from an electrical circuit or the like on the vehicle body side in a lower column cover L (not shown).

The rotator-side connectors 23 are each connected to a cable (not shown) drawn from an electrical circuit or the like of, for example, a horn switch, an airbag switch or the like in the steering wheel.

The above-mentioned retainer 41 includes a plurality of rotatable rollers 43 and a base ring 42, and is located to be rotatable in the accommodation space S around the rotation axis of the rotator 13 as the rotation center.

The plurality of rotatable rollers 43 are provided concentrically with the retainer 41 at an equal interval in a circumferential direction of the retainer 41. The rotatable rollers 43 are provided by the same number as that of roller supporting projection sections 45 described later, and are axially supported by the roller supporting projection sections 45 respectively. The rotatable rollers 43 are each provided to be rotatable, with an axis parallel to the rotation axis of the rotator 13 being the rotation center.

The base ring 42 includes a plate-like base ring main body 44 having a ring shape when seen in a plan view, the roller supporting projection sections 45, and regulation sections 47 and 48.

The base ring main body 44 is located on the fixed-side ring plate 14 and is structured to be rotatable with respect to the stator 12.

The roller supporting projection sections 45 are provided at an equal interval in a circumferential direction of the base ring main body 44, and project upward so as to be capable of axially supporting the rotatable rollers 43.

The regulation sections 47 and 48 are provided at a diametrically outer position to the roller supporting projection sections 45, and each project upward with respect to the base ring main body 44 so as to guide a turned-around part (reversed part Cr described later) of the flat cables C, which is turned around and wound along a rotatable roller 43 as described later. The reversed part Cr are guided from outside in the diametric direction of the roller supporting projection sections 45.

The regulation sections 47 and 48 are located between the rotatable rollers 43 axially supported by the retainer 41 and are structured to have a wall curved at a curvature which is equal to, or greater than, that of the circumferential surface of the rotatable rollers 43.

Among the regulation sections 47 and 48 standing like walls, the regulation section 48 facing one of the rotatable rollers 43, i.e., a rotatable rollers 43a, along which the reversed part Cr of the flat cables C can be wound, receives a pressure for rotating the retainer 41. The regulation section 48 has a curved surface 49 having a curvature in accordance with the curving of the reversed part Cr so as to receive the reversed part Cr of the flat cables C, which is curved in a U shape or a semicircular shape.

The regulation section 48 is located forward with respect to the rotatable roller 43a in a clockwise direction X. The regulation section 48 is distanced from a part of the rotatable roller 43a along which the reversed part Cr can be wound, by a gap which allows the reversed part Cr to contact or detached from the rotatable roller 43a.

The rotatable roller 43a along which the reversed part Cr can be wound is formed to have a shorter diameter than the diameters of the other rotatable rollers 43 located concentrically with the retainer 41 in the circumferential direction of the retainer 41. The rotatable roller 43a is located such that an axial center Pa thereof is outer to a reference line D connecting axial centers P of the other rotatable rollers 43 (see FIG. 3).

As shown in FIG. 2, the rotation lock unit 51 includes a rock body 52, a spring receiving sleeve 54, and a return spring 53 provided between the lock body 52 and the spring receiving sleeve 54.

By pressing up the spring receiving sleeve 54 against an urging force of the return spring 53, the rotator 13 can be locked by means of the lock body 52 so as not to be rotatable with respect to the stator 12. Alternatively, by inserting a boss section (not shown) of a core bar of the steering wheel into the lock unit 51, the rotator 13 can be released from the locked state provided by the lock body 52 so as to be permitted to be freely rotatable with respect to the stator 12.

Two flat cables C are accommodated in the accommodation space S while being wound around therein in a layered state. One of the two layered flat cables C is connected to the first stator-side connector 17A at one end in a length direction thereof and is connected to the first rotator-side connector 23A at the other end.

The other of the two layered flat cables C is connected to the second stator-side connector 17B at one end in the length direction thereof and is connected to the second rotator-side connector 23B at the other end.

Such flat cables C are supported by the retainer 41 rotatably placed on the fixed-side ring plate 14, and are accommodated in the accommodation space S inside the cable housing 11 in a wound state.

In more detail, the flat cables C are drawn into the accommodation space S from the first stator-side connector 17A and the second stator-side connector 17B respectively, and thus as shown in FIG. 3 through FIG. 5, an outside wound part Co having no inflection point is formed which is wound along an inner circumferential surface of the outer cylindrical section 15 (inside outer cylindrical section 15i) of the stator 12 at a position outer to the rotatable rollers 43.

Thus, base ends of the outside wound part Co are fixed at the positions of the stator-side connectors 17.

The two flat cables C are wound around in the accommodated space S in a layered state as described above, but in FIG. 4 and FIG. 5, such a structure is simplified and only one wound flat cable C is shown.

As shown by the dashed line in FIG. 3, the flat cables C have the reversed part Cr in the middle thereof in the length direction. The reversed part Cr is turned around in a U shape and wound along one of the plurality of rotatable rollers 43, namely, the rotatable roller 43a.

A part of the flat cables C after this part up to the other end in the length direction is formed to be an inside wound part Ci which has an inflection point and is wound along an outer circumferential surface of the inner cylindrical section 22 of the rotator 13 at a position inner to the rotatable rollers 43.

The flat cables C are finally drawn out of the accommodation space S and connected to the first rotator-side connector 23A and the second rotator-side connector 23B.

Thus, base ends of the inside wound part Ci are fixed at the positions of the rotator-side connectors 23.

As described above, by the rotation of the rotator 13 and the stator 12 with respect to each other, the outside wound part Co and the inside wound part Ci of the flat cables C are respectively wound and unwound, or vice versa, in the accommodation space S.

An operation of winding and unwinding the flat cables C by use of the above-described steering roll connector 10 will be described.

At the time of being wound and unwound, the reversed part Cr of the flat cables C is appropriately rotated together with the retainer 41 so as to follow the change of balance in the wound state between the outside wound part Co and the inside wound part Ci.

Owing to this, the steering roll connector 10 can always hold the flat cables C in an aligned wound state in the accommodation space S and can rotate the steering wheel smoothly.

In more detail, when the rotator 13 is rotated in the clockwise direction X shown in FIG. 3, the flat cables C having one end thereof fixed to the rotator 13 are wound and unwound. During this process, the reversed part Cr of the flat cables C is moved in the clockwise direction X in the circumferential direction of the retainer 41 while being unwound from the circumferential surface of the rotatable roller 43a.

The reversed part Cr, represented by the phantom line in FIG. 6, of the flat cables C is pressed to the curved surface 49 of the regulation section 48. Because of the above-mentioned movement of the reversed part Cr, the regulation section 48 is pressed in the circumferential direction, and thus the retainer 41 is rotated in the clockwise direction X (see FIG. 3).

The rotatable roller 43a along which the reversed part Cr can be wound is located such that the axial center P thereof is outer to the reference line D connecting the axial centers P of the other rotatable rollers 43. Therefore, the gap, made between the rotatable roller 43a and the curved surface 49 of the regulation section 48, through which the reversed part Cr passes can be formed to have a shape in accordance with the curvature of the reversed part Cr. In addition, when the rotation direction of the steering roll connector 10 is switched from a counterclockwise direction to the clockwise direction, the reversed part Cr and the rotatable roller 43a are released from the contact state, and then the reversed part Cr moves in no contact with the rotatable roller 43a or the curved surface 49 of the regulation section 48 until contacting the curved surface 49 of the regulation section 48. The distance by which the reversed part Cr moves in such a non-contact state can be increased.

In this manner, when the steering roll connector 10 mounted on the vehicle receives small swings from a vehicle handle while the vehicle is running, namely, when a motion of switching the rotation direction of the vehicle handle from the counterclockwise direction to the clockwise direction by a small angle is repeated, the state where the flat cables C and the curved surface 49 of the regulation section 48 are out of contact with each other can be increased.

Owing to this, the number of times that the reversed part Cr of the flat cables C and the curved surface 49 of the regulation section 48 contact, and thus are slid on, each other is significantly decreased. Thus, the lamination covers of the flat cables C are less likely to be worn. Accordingly, shortcircuiting or breakage of conductors can be prevented.

As a result, the contact area between the reversed part Cr of the flat cables C and the regulation section 48 is increased, and thus the load (reaction force) from the retainer 41 which is received by the reversed part Cr is distributed in the entirety of the contact surface. Therefore, the load can be received by a large area of the reversed part Cr. In addition, the rotation angle of the rotator 13 with respect to the stator 12 for contacting the reversed part Cr of the flat cables C and the curved surface 49 of the regulation section 48 can be increased (namely, play can be increased). Thus, this embodiment of the present invention can reduce the wearing.

In this process, the reversed part Cr of the flat cables C moves together with the regulation section 48 as described above, but without contacting the rotatable roller 43.

When the rotator 13 is rotated in a counterclockwise direction Y shown in FIG. 3, the flat cables C having one end thereof fixed to the rotator 13 are wound and unwound. During this process, the reversed part Cr of the flat cables C is moved in the counterclockwise direction Y in the circumferential direction of the retainer 41.

Because of this movement, the reversed part Cr, represented by the solid line in FIG. 6, of the flat cables C pulls the rotatable roller 43a, along which the reversed part Cr is wound, in the counterclockwise direction Y, and thus the retainer 41 is rotated in the counterclockwise direction Y (see FIG. 3).

In this process, the reversed part Cr of the flat cables C moves together with the rotatable roller 43a as described above but without contacting the regulation section 48.

As described above, one of the rotatable rollers 43, namely, the rotatable roller 43a along which the reversed part Cr of the flat cables C can be wound is located outer to the reference line D. Therefore, when the steering roll connector 10 is operated to rotate in the clockwise direction X so as to unwind the flat cables C, the gap, made between the rotatable roller 43a and the curved surface 49 of the regulation section 48, through which the reversed part Cr passes can be formed to have a shape in accordance with the curvature of the reversed part Cr. In addition, when the rotation direction of the steering roll connector 10 is switched from the counterclockwise direction to the clockwise direction, the distance, by which the reversed part Cr moves in no contact with the rotatable roller 43a or the curved surface 49 of the regulation section 48 after being released from the contact with the rotatable roller 43a until contacting the curved surface 49 of the regulation section 48, can be increased.

In this manner, when the steering roll connector 10 mounted on the vehicle receives small swings from a vehicle handle while the vehicle is running, namely, when a motion of switching the rotation direction of the vehicle handle from the counterclockwise direction to the clockwise direction by a small angle is repeated, the state where the flat cables C and the curved surface 49 of the regulation section 48 are out of contact with each other can be increased.

Owing to this, the number of times that the reversed part Cr of the flat cables C and the curved surface 49 of the regulation section 48 contact, and thus are slid on, each other is significantly decreased. Thus, the lamination covers of the flat cables C are less likely to be worn. Accordingly, shortcircuiting or breakage of conductors can be prevented.

In addition, the rotatable roller 43a is formed to have a short diameter. Therefore, when the rotation direction of the steering roll connector 10 is switched from the counterclockwise direction to the clockwise direction, the distance, by which the reversed part Cr moves in no contact with the rotatable roller 43a or the curved surface 49 of the regulation section 48 after being released from the contact with the rotatable roller 43a until contacting the curved surface 49 of the regulation section 48, can be further increased.

Owing to this, the number of times that the reversed part Cr of the flat cables C and the curved surface 49 of the regulation section 48 contact, and thus are slid on, each other is significantly decreased. Thus, the lamination covers of the flat cables C are less likely to be worn. Accordingly, shortcircuiting or breakage of conductors can be prevented.

Figure 7:
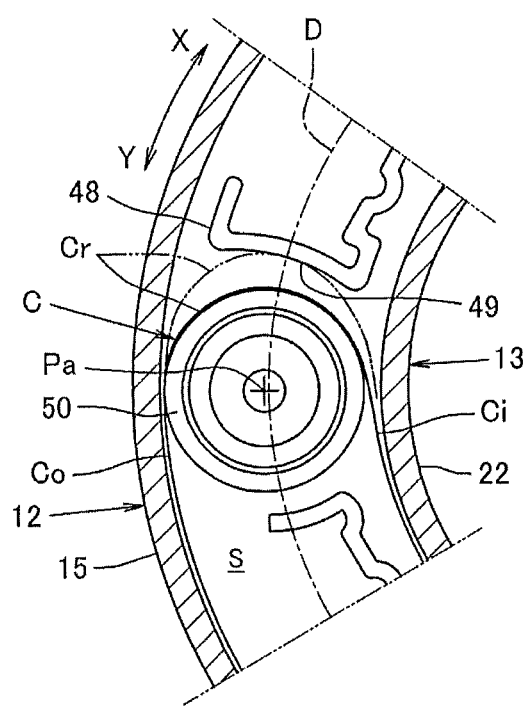
FIG. 7 is a view illustrating an operation when the flat cables are wound along a large diameter rotatable roller.
Figure 8:
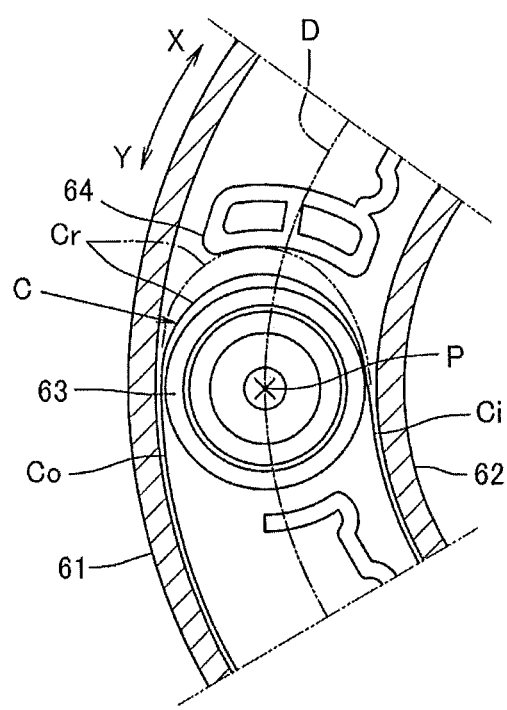
FIG. 8 is a view illustrating a conventional operation of a reversed part of flat cables.

FIG. 7 shows another operational view illustrating an operation when the reversed part Cr of the flat cables C is wound along a long diameter rotatable roller 50.

The rotatable roller 50 is formed to have a diameter which is approximately the same as those of the other rotatable rollers 43, and is located such that an axial center Pa of the rotatable roller 50 is outer to the reference line D connecting the axial centers P of the other rotatable rollers 43.

Namely, even without the small diameter rotatable roller 43a, as long as the rotatable roller 50 along which the reversed part Cr of the flat cables C can be wound is located outer to the reference line D, the curvature deformation ratio across the inflection point of the inside wound part Ci of the flat cables C can be reduced.

As a result, the contact area between the reversed part Cr of the flat cables C and the regulation section 48 is increased, and thus the load from the retainer 41 which is received by the reversed part Cr is distributed in the entirety of the contact surface. Therefore, generally the same functions and effects as those of the above-described embodiment can be provided.

The rotatable connector device according to the present invention corresponds to the steering roll connector 10 in the embodiments.

However, the present invention is not limited to the above-described embodiment, and can be applied to many other embodiments based on the technological philosophy presented in the claims.

REFERENCE SIGNS LIST

X . . . Clockwise direction
Y . . . Counterclockwise direction
C . . . Flat cable
Cr . . . Reversed part
S . . . Accommodation space
10 . . . Steering roll connector
11 . . . Cable housing
12 . . . Stator
13 . . . Rotator
15 . . . Outer cylindrical section
22 . . . Inner cylindrical section
41 . . . Retainer
43a, 50 . . . Rotatable roller
47, 48 . . . Regulation section
49 . . . Curved surface

The invention claimed is:

1. A rotatable connector device, comprising a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the ring-shaped fixed-side ring plate, the rotator and the stator being engaged with each other so as to be rotatable with respect to each other in a clockwise direction and a counterclockwise direction;

wherein:

in an accommodation space defined by the rotatable-side ring plate and the inner cylindrical section of the rotator and the fixed-side ring plate and the outer cylindrical section of the stator, a ring-shaped retainer for axially supporting at least three rotatable rollers is accommodated, and also a flat cable for electrically connecting the rotator and the stator to each other, the flat cables having a reversed part which is turned around in the middle of the flat cable in a length direction thereof, is accommodated such that the flat cable can be wound and unwound;

the three rotatable rollers are located on a top surface of the retainer, concentrically with the retainer at an equal interval in a circumferential direction of the retainer, and a regulation section on which the reversed part is allowed to be pressed is provided on the top surface of the retainer at a position away from one of the three rotatable rollers, on the side of a part of the one rotatable roller along which the reversed part can be wound, the regulation section being away from the part of the one rotatable roller by a gap which allows the reversed part to contact or detached from the one rotatable roller; and an axial center of the one rotatable roller along which the reversed part can be wound is located outer to a reference line connecting axial centers of the other two rotatable rollers which are located concentrically with the retainer in the circumferential direction of the retainer.

2. A rotatable connector device according to claim 1, wherein the one rotatable roller is formed to have a diameter which is shorter than a distance between a circumferential surface of the inner cylindrical section and a circumferential surface of the outer cylindrical section, the circumferential surfaces facing each other.

3. A rotatable connector device according to claim 1, further comprising friction resistance reduction means for reducing a friction resistance provided to the reversed part, the friction resistance reduction means being provided on a part of a surface of the regulation section on which the reversed part is pressed.

4. A rotatable connector device according to claim 2, further comprising friction resistance reduction means for reducing a friction resistance provided to the reversed part, the friction resistance reduction means being provided on a part of a surface of the regulation section on which the reversed part is pressed.

\* \* \* \* \*